(12) United States Patent
Kook et al.

(10) Patent No.: US 10,281,010 B2
(45) Date of Patent: May 7, 2019

(54) PLANETARY GEAR TRAIN OF AUTOMATIC TRANSMISSION FOR VEHICLES

(71) Applicants: HYUNDAI MOTOR COMPANY, Seoul (KR); KIA MOTORS CORPORATION, Seoul (KR)

(72) Inventors: Jae Chang Kook, Hwaseong-si (KR); Hyun Sik Kwon, Seoul (KR); Ki Tae Kim, Incheon (KR); Wonmin Cho, Hwaseong-si (KR); Seong Wook Hwang, Gunpo-si (KR); Seongwook Ji, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 44 days.

(21) Appl. No.: 15/711,465

(22) Filed: Sep. 21, 2017

(65) Prior Publication Data
US 2018/0298989 A1    Oct. 18, 2018

(30) Foreign Application Priority Data

Apr. 18, 2017    (KR) .................. 10-2017-0049876

(51) Int. Cl.
*F16H 3/62*    (2006.01)
*F16H 57/00*    (2012.01)
*F16H 57/02*    (2012.01)

(52) U.S. Cl.
CPC .......... *F16H 3/62* (2013.01); *F16H 57/0018* (2013.01); *F16H 2057/02047* (2013.01); *F16H 2057/02091* (2013.01); *F16H 2200/0065* (2013.01); *F16H 2200/2012* (2013.01); *F16H 2200/2046* (2013.01)

(58) Field of Classification Search
CPC .............. F16H 3/62; F16H 57/0018; F16H 2057/02047; F16H 2200/0069; F16H 2200/2015; F16H 2200/2046; F16H 3/66
See application file for complete search history.

(56) References Cited

U.S. PATENT DOCUMENTS

| | | | |
|---|---|---|---|
| 8,197,376 B2 * | 6/2012 | Gumpoltsberger | F16H 3/66 475/269 |
| 8,591,376 B1 * | 11/2013 | Shim | F16H 3/66 475/276 |

(Continued)

*Primary Examiner* — Patrick H MacKey
(74) *Attorney, Agent, or Firm* — Brinks Gilson & Lione

(57) ABSTRACT

A planetary gear train of an automatic transmission for a vehicle improves power delivery and fuel efficiency by applying six control elements to four planetary gear sets to achieve forward nine speed stages and one reverse speed stage. The planetary gear train includes: an input shaft; an output shaft; first to fourth first planetary gear sets each having three rotational element: four clutches and two brakes as the six control elements; and first to ninth shafts. In particular, the first shaft connects a first rotational element and the input shaft; the second shaft is connected with a second rotational element and selectively connected with the first shaft; the third shaft connects third and fifth rotational elements; the fourth shaft is connected with a fourth rotational element and fixed to a transmission housing; and the fourth shaft is connected with the fourth rotational element and fixed to the transmission housing.

8 Claims, 2 Drawing Sheets

(56) References Cited

U.S. PATENT DOCUMENTS

Figure 1:
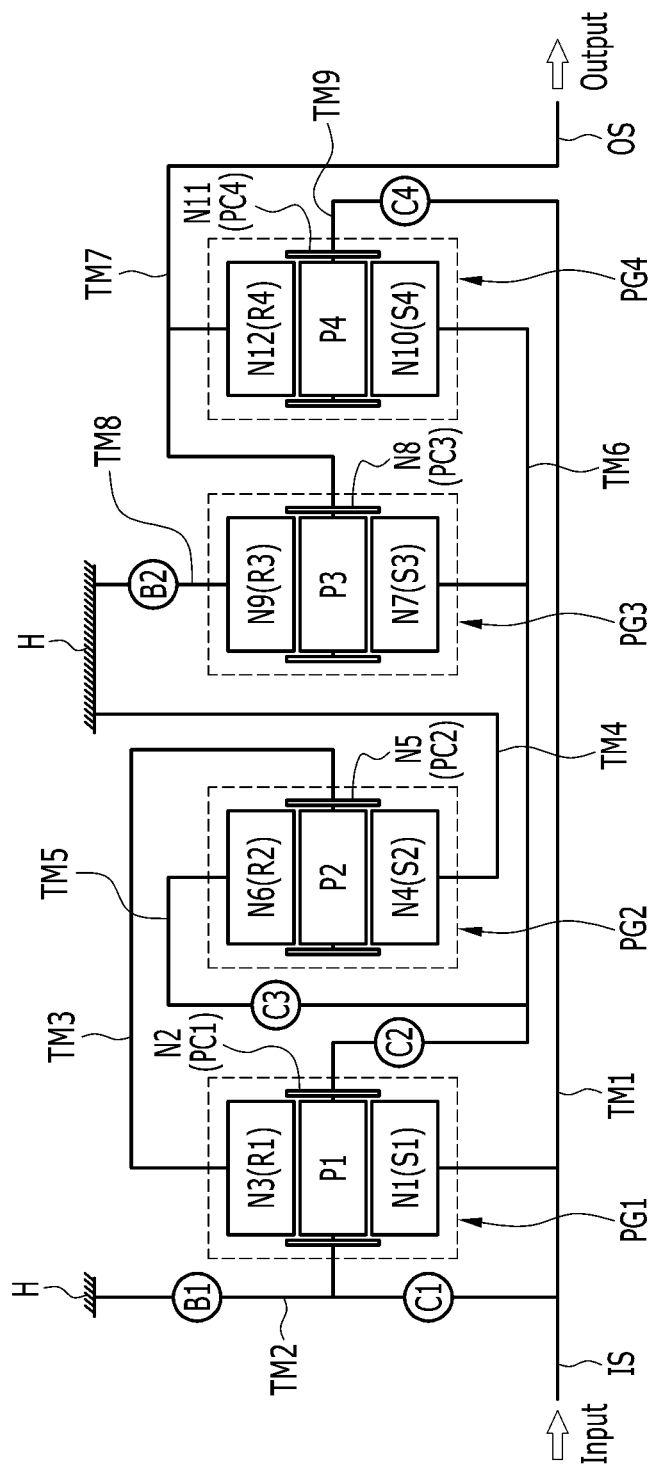

| | | | | |
|---|---|---|---|---|
| 8,784,259 | B2* | 7/2014 | Shim | F16H 3/66 475/281 |
| 8,992,371 | B1* | 3/2015 | Shim | F16H 3/66 475/276 |
| 9,618,092 | B2* | 4/2017 | Hwang | F16H 3/66 |
| 9,631,705 | B2* | 4/2017 | Ji | F16H 3/66 |
| 9,927,008 | B1* | 3/2018 | Burchett | F16H 3/66 |
| 10,072,736 | B2* | 9/2018 | Burchett | F16H 3/66 |
| 2009/0247351 | A1* | 10/2009 | Seo | F16H 3/666 475/275 |
| 2011/0045943 | A1* | 2/2011 | Gumpoltsberger | F16H 3/66 475/275 |

* cited by examiner

FIG. 2

| Shift-stage | Control element | | | | | | Gear ratio |
|---|---|---|---|---|---|---|---|
| | C1 | C2 | C3 | C4 | B1 | B2 | |
| D1 | | ● | ● | | | ● | 5.748 |
| D2 | ● | ● | | | | ● | 3.300 |
| D3 | ● | | ● | | | ● | 2.235 |
| D4 | ● | | | ● | | ● | 1.657 |
| D5 | ● | | ● | ● | | | 1.235 |
| D6 | ● | ● | | ● | | | 1.000 |
| D7 | | ● | ● | ● | | | 0.854 |
| D8 | | ● | | ● | ● | | 0.714 |
| D9 | | | ● | ● | ● | | 0.604 |
| REV | | | ● | | ● | ● | -5.142 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2017-0049876, filed on Apr. 18, 2017, which is incorporated herein by reference in its entirety.

FIELD

The present disclosure relates to a planetary gear train of an automatic transmission for a vehicle having advantages of improving power delivery performance and fuel consumption.

BACKGROUND

The statements in this section merely provide background information related to the present disclosure and may not constitute prior art.

Generally, in automatic transmission field, achieving more shift stages is a technology for improving fuel consumption and driving efficiency and has been researched, and recent increases in oil prices are triggering hard competition in enhancing fuel consumption of a vehicle.

In this sense, research on an engine has been undertaken to achieve weight reduction and to enhance fuel consumption by so-called downsizing, and research on an automatic transmission has been performed to simultaneously provide better drivability and fuel consumption by achieving more shift stages.

In order to achieve more shift stages for an automatic transmission, the number of parts, particularly the number of planetary gear sets is typically increased. This negatively affects installability, production cost, weight, and power flow efficiency, and a total length of transmission.

The majority of general automatic transmissions having more than eight speeds also increase its total length, which has drawbacks of deteriorating installability.

As a result, plural rows structure which planetary gear sets are on planetary gear sets has been adopted, or a dog clutch is applied in place of wet control elements. However, in this case, applicable structure is restricted and shift feel is deteriorated by applying the dog clutch.

The above information disclosed in this Background section is only for enhancement of understanding of the background of the present disclosure and therefore it may contain information that does not form the prior art that is already known in this country to a person of ordinary skill in the art.

SUMMARY

The present disclosure has been made in an effort to provide a planetary gear train of an automatic transmission for a vehicle having advantages of obtaining shift-stages of the forward nine speeds and one reverse speed with reduced number of parts, improving power delivery performance and fuel consumption by multi-stages of an automatic transmission, and improving driving stability of a vehicle by utilizing a low rotation speed of an engine.

A planetary gear train according to an exemplary form of the present disclosure includes: an input shaft for receiving an engine torque; an output shaft for outputting a shifted torque; a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; a first shaft connected with the first rotational element, and connected with the input shaft; a second shaft connected with the second rotational element and selectively connected with the first shaft; a third shaft connected with the third rotational element and the fifth rotational element; a fourth shaft connected with the fourth rotational element and fixed to a transmission housing; a fourth shaft connected with the fourth rotational element and fixed to a transmission housing; a sixth shaft connected with the seventh rotational element and the tenth rotational element and selectively connected with the second shaft and fifth shaft respectively; a seventh shaft connected with the eighth rotational element and the twelfth rotational element, and connected with the output shaft; an eighth shaft connected with the ninth rotational element; and a ninth shaft connected with the eleventh rotational element and selectively connected with the first shaft.

Further, the second and eighth shafts may be selectively connected with the transmission housing respectively.

Further, the first, second, and third rotational elements of the first planetary gear set may be respectively a first sun gear, a first planet carrier, and a first ring gear of the first planetary gear set, the fourth, fifth, and sixth rotational elements of the second planetary gear set may be respectively a second sun gear, a second planet carrier, and a second ring gear of the second planetary gear set, the seventh, eighth, and ninth rotational elements of the third planetary gear set may be respectively a third sun gear, a third planet carrier, and a third ring gear of the third planetary gear set, and the tenth, eleventh, and twelfth rotational elements of the fourth planetary gear set may be respectively a fourth sun gear, a fourth planet carrier, and a fourth ring gear of the fourth planetary gear set.

Further, the planetary gear train may include a first clutch selectively connecting the first shaft and the second shaft; a second clutch selectively connecting the second shaft and the sixth shaft; a third clutch selectively connecting the fifth shaft and the sixth shaft; a fourth clutch selectively connecting the first shaft and the ninth shaft; a first brake selectively connecting the second shaft and the transmission housing; and a second brake selectively connecting the eighth shaft and the transmission housing.

A planetary gear train of an automatic transmission for a vehicle according to an exemplary form of the present disclosure, shift-stages of forward nine speeds and one reverse speed may be realized by combination of four planetary gear sets of simple planetary gear sets and six control elements.

Further, a planetary gear train according to an exemplary form of the present disclosure may realize shift stages appropriate for rotation speed of an engine due to multi-stages of an automatic transmission and improve driving stability of a vehicle by utilizing a low rotation speed of an engine.

Further, a planetary gear train according to an exemplary form of the present disclosure maximize engine driving efficiency by multi-stages of an automatic transmission, and may improve power delivery performance and fuel consumption.

Further, effects that can be obtained or expected from exemplary forms of the present disclosure are directly or suggestively described in the following detailed description.

That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic diagram of a planetary gear train according to an exemplary form of the present disclosure; and FIG. 2 is an operational chart for respective control elements at respective shift stages in a planetary gear train according to an exemplary form of the present disclosure.

The drawings described herein are for illustration purposes only and are not intended to limit the scope of the present disclosure in any way.

DETAILED DESCRIPTION

Hereinafter, an exemplary form of the present disclosure will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

Further, as used herein, description of elements being "directly" connected or interconnected includes elements that are fixedly connected, i.e. one element directly and/or fixedly connected to another element for rotation therewith.

FIG. 1 is a schematic diagram of a planetary gear train according to an exemplary form of the present disclosure.

Referring to FIG. 1, a planetary gear train includes: first, second, third, and fourth planetary gear sets PG1, PG2, PG3, and PG4 arranged on a same axis, an input shaft IS, an output shaft OS, nine shafts TM1 to TM9 connected with rotational elements of the first, second, third, and fourth planetary gear sets PG1, PG2, PG3, and PG4, four clutches C1 to C4 and two brakes B1 and B2 as control elements, and a transmission housing H.

Torque input from the input shaft IS is shifted by cooperative operation of the first, second, third, and fourth planetary gear sets PG1, PG2, PG3, and PG4, and then output through the output shaft OS.

The simple planetary gear sets are arranged in the order of first, second, third and fourth planetary gear sets PG1, PG2, PG3 and PG4, from an engine side.

The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus which is not illustrated.

The first planetary gear set PG1 is a single pinion planetary gear set, and includes a first sun gear S1, a first planet carrier PC1 that supports a plurality of first pinion gear P1 externally engaged with the first sun gear S1 so that the first pinion gear P1 may rotate and revolve, and a first ring gear R1 internally engaged and torque-connected with a plurality of the first pinion gear P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports a plurality of second pinion gear P2 externally engaged with the second sun gear S2 so that the second pinion gear P2 may rotate and revolve, and a second ring gear R2 internally engaged and torque-connected with a plurality of the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that supports a plurality of a third pinion gear P3 externally engaged with the third sun gear S3 so that the third pinion gear P3 may rotate and revolve, and a third ring gear R3 internally engaged and torque-connected with a plurality of the third pinion P3. The third sun gear S3 acts as a seventh rotational element N7, the third planet carrier PC3 acts as a eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports a plurality of a fourth pinion gear P4 externally engaged with the fourth sun gear S4 so that the fourth pinion gear P4 may rotate and revolve, and a fourth ring gear R4 internally engaged and torque-connected with a plurality of the fourth pinion P4. The fourth sun gear S4 acts as a tenth rotational element N10, the fourth planet carrier PC4 acts as a eleventh rotational element N11, and the fourth ring gear R4 acts as a twelfth rotational element N12.

In the arrangement of the first, second, third, and fourth planetary gear sets PG1, PG2, PG3, and PG4, the third rotational element N3 and the fifth rotational element N5 are directly connected with each other, the seventh rotational element N7 and the tenth rotational element N10 are directly connected with each other, and the eighth rotational element N8 and the twelfth rotational element N12 are directly connected with each other by a corresponding shaft selected from the nine shafts TM1 to TM9.

The nine shafts TM1 to TM9 are arranged as follows.

Each of the nine shafts TM1 to TM9 may be a rotational member that delivers torque and rotates with rotational element via directly or selectively interconnecting a plurality of the rotational elements of the rotational elements of the planetary gear sets PG1, PG2, PG3, and PG4, and the nine shafts TM1 to TM9 may be a rotational member selectively connecting the rotational element with the transmission housing H, or be a fixed member directly connecting and fixing the rotational element(s) with the transmission housing H.

The first shaft TM1 directly connects the first rotational element N1 (the first sun gear S1) and is directly connected with the input shaft IS, thereby always acting as an input element.

The second shaft TM2 is connected, and preferably fixedly connected, with the second rotational element N2 (the first planet carrier PC1), selectively connected with the first shaft TM1, and selectively connected with the transmission housing H, thereby acting as a selective fixed element.

The third shaft TM3 is connected, and preferably fixedly connected, with the third rotational element N3 (the first ring gear R1) and the fifth rotational element N5 (the second planet carrier PC2).

The fourth shaft TM4 is connected, and preferably fixedly connected, with the fourth rotational element N4 (the second sun gear S2), and directly connected with the transmission housing H, thereby always acting as a fixed element.

The fifth shaft TM5 is connected, and preferably fixedly connected, with the sixth rotational element N6 (the second ring gear R2).

The sixth shaft TM6 is connected, and preferably fixedly connected, with the seventh rotational element N7 (the third sun gear S3) and the tenth rotational element N10 (the fourth sun gear S4) and selectively connected with the second shaft TM2 and the fifth shaft TM5.

The seventh shaft TM7 is connected, and preferably fixedly connected, with the eighth rotational element N8 (the third planetary carrier PC3) and the twelfth rotational element N12 (the fourth ring gear R4), and connected with the output shaft OS, thereby always acting as an output element.

The eighth shaft TM8 is connected, and preferably fixedly connected, with the ninth rotational element N9 (the third ring gear R3), and selectively connected with the transmission housing H, thereby acting as a selective fixed element.

The ninth shaft TM9 is connected, and preferably fixedly connected, with the eleventh rotational element N11 (the fourth planetary carrier PC4), and selectively connected with the first shaft TM1.

The nine shafts TM1 to TM9, the input shaft IS, and the output shaft OS may be selectively interconnected with one another by control elements of four clutches C1, C2, C3 and C4.

The shafts TM1 to TM9 may be selectively connected with the transmission housing H, by control elements of two brakes B1 and B2.

The four clutches C1 to C4 and the two brakes B1 and B2 are arranged as follows.

The first clutch C1 is arranged between the first shaft TM1 and the second shaft TM2, so as to selectively connect the first shaft TM1 and the second shaft TM2 for power delivery.

The second clutch C2 is arranged between the second shaft TM2 and the sixth shaft TM6, so as to selectively connect the second shaft TM2 and the sixth shaft TM6 for power delivery.

The third clutch C3 is arranged between the fifth shaft TM5 and the sixth shaft TM6, so as to selectively connect the fifth shaft TM5 and the sixth shaft TM6 for power delivery.

The fourth clutch C4 is arranged between the first shaft TM1 and the ninth shaft TM9, so as to selectively connect the first shaft TM1 and the ninth shaft TM9 for power delivery.

The first brake B1 is arranged between the second shaft TM2 and the transmission housing H, such that the second shaft TM2 may be selectively connected with the transmission housing H and act as a fixed element.

The second brake B2 is arranged between the eighth shaft TM3 and the transmission housing H, such that the eighth shaft TM8 may be selectively connected with the transmission housing H and act as a fixed element.

The control elements of the first, second, third, and fourth clutches C1, C2, C3, and C4 and the first and second brakes B1 and B2 may be realized as hydraulic pressure friction control elements that are frictionally engaged by hydraulic pressure supplied from a hydraulic pressure control devices. The control elements are primarily used as a wet multi-plate hydraulic pressure friction control element, but as control elements which may operate according to electric signal supplied from an electronic control devices such as a dog clutch, an electro-magnetic clutch, a magna clutch etc.

FIG. 2 is an operational chart for respective control elements at respective shift stages in a planetary gear train according to an exemplary form of the present disclosure.

Referring to FIG. 2, a planetary gear train realizes forward nine speeds and one reverse speed by operating three control elements among the first, second, third, and fourth clutches C1, C2, C3, and C4 and the first and second brakes B1 and B2 at respective shift-stages.

In the forward first speed shift-stage D1, the second and third clutches C2 and C3 and the second brake B2 are simultaneously operated.

As a result, the second shaft TM2 and the sixth shaft TM6 are interconnected with each other by the operation of the second clutch C2, and the fifth shaft TM5 and the sixth shaft TM6 are interconnected with each other by the operation of the third clutch C3. In this state, torque of the Input shaft IS is input to the first shaft TM1.

Further, the eighth shaft TM8 acts as a fixed element by the operation of the second brake B2, thereby realizing the forward first speed and outputting a shifted torque through the output shaft OS connected with the seventh shaft TM7.

In the forward second speed shift-stage D2, the first and second clutches C1 and C2 and the second brake B2 are simultaneously operated.

As a result, the first shaft TM1 and the second shaft TM2 are interconnected with each other by the operation of the first clutch C1, and the second shaft TM2 and the sixth shaft TM6 are interconnected with each other by the operation of the second clutch C2. In this state, torque of the Input shaft IS is input to the first shaft TM1.

Further, the eighth shaft TM8 acts as a fixed element by the operation of the second brake B2, thereby realizing the forward second speed and outputting a shifted torque through the output shaft OS connected with the seventh shaft TM7.

In the forward third speed shift-stage D3, the first and third clutches C1 and C3 and the second brake B2 are simultaneously operated.

As a result, the first shaft TM1 and the second shaft TM2 are interconnected with each other by the operation of the first clutch C1, and the fifth shaft TM5 and the sixth shaft TM6 are interconnected with each other by the operation of the third clutch C3. In this state, torque of the Input shaft IS is input to the first shaft TM1.

Further, the eighth shaft TM8 acts as a fixed element by the operation of the second brake B2, thereby realizing the forward third speed and outputting a shifted torque through the output shaft OS connected with the seventh shaft TM7.

In the forward fourth speed shift-stage D4, the first and fourth clutches C1 and C4 and the second brake B2 are simultaneously operated.

As a result, the first shaft TM1 and the second shaft TM2 are interconnected with each other by the operation of the first clutch C1, and the sixth shaft TM6 and the ninth shaft TM9 are interconnected with each other by the operation of the fourth clutch C4. In this state, torque of the Input shaft IS is input to the first shaft TM1.

Further, the eighth shaft TM8 acts as a fixed element by the operation of the second brake B2, thereby realizing the forward fourth speed and outputting a shifted torque through the output shaft OS connected with the seventh shaft TM7.

In the forward fifth speed shift-stage D5, the first, third, and fourth clutches C1, C3, and C4 are simultaneously operated.

As a result, the first shaft TM1 and the second shaft TM2 are interconnected with each other by the operation of the first clutch C1, the fifth shaft TM5 and the sixth shaft TM6 are interconnected with each other by the operation of the third clutch C3, and the first shaft TM1 and the ninth shaft TM9 are interconnected with each other by the operation of the fourth clutch C4. In this state, torque of the Input shaft IS is input to the first shaft TM1.

Then, the forward fifth speed is realized and a shifted torque through the output shaft OS connected with the seventh shaft TM7 is output.

In the forward sixth speed shift-stage D6, the first, second, and fourth clutches C1, C2, and C4 are simultaneously operated.

As a result, the first shaft TM1 and the second shaft TM2 are interconnected with each other by the operation of the first clutch C1, the second shaft TM2 and the sixth shaft TM6 are interconnected with each other by the operation of the second clutch C2, and the first shaft TM1 and the ninth shaft TM9 are interconnected with each other by the operation of the fourth clutch C4. In this state, torque of the Input shaft IS is input to the first shaft TM1.

Then, the first, second, third, and fourth planetary gear sets PG1, PG2, PG3, and PG4 are integrally rotate, and a shifted torque of the input shaft IS is transmitted to a forward sixth speed to be output through the output shaft OS connected with the seventh shaft TM7.

In the forward sixth speed shift-stage D7, the second, third, and fourth clutches C2, C3, and C4 are simultaneously operated.

As a result, the second shaft TM2 and the sixth shaft TM6 are interconnected with each other by the operation of the second clutch C2, the fifth shaft TM5 and the sixth shaft TM6 are interconnected with each other by the operation of the third clutch C3, and the first shaft TM1 and the ninth shaft TM9 are interconnected with each other by the operation of the fourth clutch C4. In this state, torque of the Input shaft IS is input to the first shaft TM1.

Then, the forward seventh speed is realized and a shifted torque through the output shaft OS connected with the seventh shaft TM7 is output.

In the forward eighth speed shift-stage D8, the second and fourth clutches C2 and C4 and the first brake B1 are simultaneously operated.

As a result, the second shaft TM2 and the sixth shaft TM6 are interconnected with each other by the operation of the second clutch C2, and the first shaft TM1 and the ninth shaft TM9 are interconnected with each other by the operation of the fourth clutch C4. In this state, torque of the Input shaft IS is input to the first shaft TM1.

Further, the second shaft TM2 acts as a fixed element by the operation of the first brake B1, thereby realizing the forward eighth speed and outputting a shifted torque through the output shaft OS connected with the seventh shaft TM7.

In the forward ninth speed shift-stage D9, the third and fourth clutches C3 and C4 and the first brake B1 are simultaneously operated.

As a result, the fifth shaft TM5 and the sixth shaft TM6 are interconnected with each other by the operation of the third clutch C3, and the first shaft TM1 and the ninth shaft TM9 are interconnected with each other by the operation of the fourth clutch C4. In this state, torque of the Input shaft IS is input to the first shaft TM1.

Further, the second shaft TM2 acts as a fixed element by the operation of the first brake B1, thereby realizing the forward ninth speed and outputting a shifted torque through the output shaft OS connected with the seventh shaft TM7.

In the reverse speed REV, the third clutch C3, the first and second brakes B1 and B2 are simultaneously operated.

As a result, the fifth shaft TM5 and the sixth shaft TM6 are interconnected by the operation of the third clutch C3. In this state, torque of the Input shaft IS is input to the first shaft TM1.

Further, the second shaft TM2 and the eighth shaft TM8 act as fixed elements by the operation of the first brake B1 and the second brake B2, thereby realizing the reverse speed and outputting a shifted torque through the output shaft OS connected with the seventh shaft TM7.

As described above, a planetary gear train according to an exemplary form of the present disclosure may realize forward nine speeds and a reverse first speed formed by operating four planetary gear sets PG1, PG2, PG3, and PG4 by controlling the four clutches C1, C2, C3, and C4 and the two brakes B1 and B2.

In addition, a planetary gear train according to an exemplary form of the present disclosure may realize shift stages appropriate for rotation speed of an engine due to multi-stages of an automatic transmission and improve driving stability of a vehicle by utilizing a low rotation speed of an engine.

In addition, a planetary gear train according to an exemplary form of the present disclosure may increase engine driving efficiency by multi-stages of an automatic transmission, and may improve power delivery performance and fuel consumption.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

B1, B2 . . . first and second brakes
C1, C2, C3, C4 . . . first, second, third, and fourth clutches
PG1, PG2, PG3, PG4 . . . first, second, third, and fourth planetary gear sets
S1, S2, S3, S4 . . . first, second, third, and fourth sun gears
PC1, PC2, PC3, PC4 . . . first, second, third, and fourth planet carriers
R1, R2, R3, R4 . . . first, second, third, and fourth ring gears
IS . . . input shaft
OS . . . output shaft
TM1, TM2, TM3, TM4, TM5, TM6, TM7, TM8, TM9 . . . first, second, third, fourth, fifth, sixth, seventh, eighth, and ninth shafts

What is claimed is:

1. A planetary gear train of an automatic transmission for a vehicle, the planetary gear train comprising:
   an input shaft configured to receive an engine torque;
   an output shaft configured to output a shifted torque;
   a first planetary gear set having first, second, and third rotational elements;
   a second planetary gear set having fourth, fifth, and sixth rotational elements;

a third planetary gear set having seventh, eighth, and ninth rotational elements;
a fourth planetary gear set having tenth, eleventh, and twelfth rotational elements;
a first shaft connected with the first rotational element, and connected with the input shaft;
a second shaft connected with the second rotational element and selectively connected with the first shaft;
a third shaft connected with the third rotational element and the fifth rotational element;
a fourth shaft connected with the fourth rotational element and fixed to a transmission housing;
a fifth shaft connected with the sixth rotational element;
a sixth shaft connected with the seventh rotational element and the tenth rotational element and selectively connected with the second shaft and the fifth shaft respectively;
a seventh shaft connected with the eighth rotational element and the twelfth rotational element, and connected with the output shaft;
an eighth shaft connected with the ninth rotational element; and
a ninth shaft connected with the eleventh rotational element and selectively connected with the first shaft.

2. The planetary gear train of claim 1, wherein the second and eighth shafts are selectively connected with the transmission housing respectively.

3. The planetary gear train of claim 2, wherein the planetary gear train includes a first clutch configured to selectively connect the first shaft and the second shaft;
a second clutch configured to selectively connect the second shaft and the sixth shaft;
a third clutch configured to selectively connect the fifth shaft and the sixth shaft;
a fourth clutch configured to selectively connect the first shaft and the ninth shaft;
a first brake configured to selectively connect the second shaft and the transmission housing; and
a second brake configured to selectively connect the eighth shaft and the transmission housing.

4. The planetary gear train of claim 1, wherein the first, second, and third rotational elements of the first planetary gear set are respectively a first sun gear, a first planet carrier, and a first ring gear of the first planetary gear set,
the fourth, fifth, and sixth rotational elements of the second planetary gear set are respectively a second sun gear, a second planet carrier, and a second ring gear of the second planetary gear set,
the seventh, eighth, and ninth rotational elements of the third planetary gear set are respectively a third sun gear, a third planet carrier, and a third ring gear of the third planetary gear set, and
the tenth, eleventh, and twelfth rotational elements of the fourth planetary gear set are respectively a fourth sun gear, a fourth planet carrier, and a fourth ring gear of the fourth planetary gear set.

5. A planetary gear train of an automatic transmission for a vehicle, the planetary gear train comprising:
an input shaft configured to receive an engine torque;
an output shaft configured to output a shifted torque;
a first planetary gear set having first, second, and third rotational elements;
a second planetary gear set having fourth, fifth, and sixth rotational elements;
a third planetary gear set having seventh, eighth, and ninth rotational elements; and
a fourth planetary gear set having tenth, eleventh, and twelfth rotational elements,
wherein the input shaft is connected with the first rotational element,
the output shaft is connected with the twelfth rotational element,
the third rotational element is connected with the fifth rotational element,
the fourth rotational element is connected with a transmission housing,
the seventh rotational element is connected with the tenth rotational element,
the eighth rotational element is connected with the twelfth rotational element,
the first rotational element is selectively connected with the eleventh rotational element,
the second rotational element is selectively connected with the first and seventh rotational elements respectively, and
the sixth rotational element is selectively connected with the seventh rotational element.

6. The planetary gear train of claim 5, wherein the second and ninth rotational elements are selectively connected with the transmission housing respectively.

7. The planetary gear train of claim 6, wherein the planetary gear train includes a first clutch configured to selectively connect the first rotational element and the second rotational element;
a second clutch configured to selectively connect the second rotational element and the seventh rotational element;
a third clutch configured to selectively connect the sixth rotational element and the seventh rotational element;
a fourth clutch configured to selectively connect the first rotational element and the eleventh rotational element;
a first brake configured to selectively connect the second rotational element and the transmission housing; and
a second brake configured to selectively connect the ninth rotational element and the transmission housing.

8. The planetary gear train of claim 5, wherein the first, second, and third rotational elements of the first planetary gear set are respectively a first sun gear, a first planet carrier, and a first ring gear of the first planetary gear set,
the fourth, fifth, and sixth rotational elements of the second planetary gear set are respectively a second sun gear, a second planet carrier, and a second ring gear of the second planetary gear set,
the seventh, eighth, and ninth rotational elements of the third planetary gear set are a third sun gear, a third planet carrier, and a third ring gear of the third planetary gear set, and
the tenth, eleventh, and twelfth rotational elements of the fourth planetary gear set are respectively a fourth sun gear, a fourth planet carrier, and a fourth ring gear of the fourth planetary gear set.

* * * * *